(12) United States Patent
Lee et al.

(10) Patent No.: US 12,378,125 B2
(45) Date of Patent: Aug. 5, 2025

(54) DEVICE AND METHOD OF PREPARING SIOX, AND SIOX ANODE MATERIAL

(71) Applicant: TERA TECHNOS CO., LTD, Daejeon (KR)

(72) Inventors: Jae Woo Lee, Sejong (KR); Jin Gee Park, Daegu (KR); Sun Ho Choi, Sejong (KR); Jung Hoon Cheon, Sejong (KR)

(73) Assignee: TERA TECHNOS CO., LTD, Daejeon (KR)

( * ) Notice: Subject to any disclaimer, the term of this patent is extended or adjusted under 35 U.S.C. 154(b) by 633 days.

(21) Appl. No.: 17/737,970

(22) Filed: May 5, 2022

(65) Prior Publication Data
US 2022/0259052 A1 Aug. 18, 2022

Related U.S. Application Data

(63) Continuation-in-part of application No. 17/118,914, filed on Dec. 11, 2020, now abandoned, which is a continuation of application No. PCT/KR2020/013529, filed on Oct. 6, 2020.

(30) Foreign Application Priority Data

Apr. 16, 2020 (KR) .................. 10-2020-0045801

(51) Int. Cl.
C01B 33/12 (2006.01)
B01J 14/00 (2006.01)
B01J 19/06 (2006.01)
H01M 4/02 (2006.01)
H01M 4/134 (2010.01)

(52) U.S. Cl.
CPC ............. *C01B 33/126* (2013.01); *B01J 14/00* (2013.01); *B01J 19/06* (2013.01); *H01M 4/134* (2013.01); *C01P 2002/54* (2013.01); *C01P 2006/40* (2013.01); *H01M 2004/027* (2013.01)

(58) Field of Classification Search
CPC ......... C01B 33/126; B01J 14/00; B01J 19/06; B01J 2219/00038; B01J 2219/00076; B01J 3/006; B01J 4/001; B01J 16/00; B01J 19/0013; H01M 4/134; H01M 2004/027; H01M 4/1395; H01M 4/364; C01P 2002/54; C01P 2006/40
See application file for complete search history.

(56) References Cited

FOREIGN PATENT DOCUMENTS

JP 2003-192327 A 7/2003

*Primary Examiner* — Andrew J. Oyer
(74) *Attorney, Agent, or Firm* — Studebaker Brackett PLLC

(57) ABSTRACT

The present invention relates to a silicon oxide preparation method and a preparation device thereof, and more particularly, to a silicon oxide preparation method capable of continuously preparing silicon oxide by a liquid phase-solid phase reaction by introducing a silicon-based molded body into silicon molten metal, and a preparation device thereof.

9 Claims, 4 Drawing Sheets

(a) INTRODUCE SILICON-BASED MOLDED BODY INCLUDING ANY TWO OR MORE OF SILICON, SILICON DIOXIDE AND MATERIAL INCLUDING METAL ELEMENT INTO SILICON MOLTEN METAL (b) PRODUCE SILICON OXIDE BY LIQUID PHASE-SOLID PHASE REACTION OF SILICON MOLTEN METAL AND SILICON-BASED MOLDED BODY

DEVICE AND METHOD OF PREPARING SIOX, AND SIOX ANODE MATERIAL

CROSS-REFERENCE TO RELATED APPLICATIONS

This application is a continuation-in-part of U.S. application Ser. No. 17/118,914, filed on Dec. 11, 2020, which is a continuation of International Patent Application No. PCT/KR2020/013529, filed Oct. 6, 2020, which is based upon and claims the benefit of priority to Korean Patent Application No. 10-2020-0045801, filed on Apr. 16, 2020. The disclosures of the above-listed applications are hereby incorporated by reference herein in their entirety.

TECHNICAL FIELD

The present invention relates to a silicon oxide preparation method and a preparation device thereof, and more particularly, to a silicon oxide preparation method capable of continuously preparing silicon oxide by a liquid phase-solid phase reaction by introducing a silicon-based molded body into silicon molten metal, and a preparation device thereof.

BACKGROUND ART

Demand for power storage devices has been rapidly increasing, from small electronic devices such as mobile (IT) devices to medium and large devices such as electric vehicles (EVs) and energy storage devices (ESS). In particular, technological development and demand for lithium secondary batteries have been rapidly increasing, and there is a demand for lithium secondary batteries having a higher energy density than those in the related art. In order to increase the energy density, research and development have been conducted on an increase in capacities of a positive electrode material and a negative electrode material, an increase in density of an electrode plate, a reduction in thickness of a separator, an increase in charge/discharge voltage, and the like, and research and development have been recently concentrated on the direction of increasing the capacities of the positive electrode material and the negative electrode material. In particular, among the negative electrode materials that determine the capacity of a lithium secondary battery, the development of silicon-based materials, which are the most promising materials for increasing the capacity, has been actively conducted.

However, the crystal structure of a silicon-based material changes as lithium ions are intercalated during charging, and the silicon-based material is accompanied by an about 4-fold higher volume expansion compared to that before lithium is intercalated. Therefore, the silicon-based material cannot withstand the change in volume as charging and discharging are repeated, cracks occur inside the crystal, the particles are destroyed, and the electrical contact between adjacent particles deteriorates, so that a result that the service life characteristics deteriorate is produced. To ameliorate these disadvantages, research has been conducted to improve the service life characteristics and alleviate volume expansion, using silicon oxide (SiOx).

In a method for preparing silicon oxide in the related art, silicon oxide was prepared in the form of a nano powder using a dry or wet preparation process. Between the preparation processes, the dry process used a method of preparing silicon oxide by reacting metallic silicon with a trace of oxygen, or heating and evaporating a silicon raw material powder to deposit silicon on the surface of ■ support. However, the dry process has the disadvantages of an increase in the preparation unit price and a long preparation time, and in particular, there is a problem in that the size of the silicon oxide particles to be prepared is non-uniform.

Meanwhile, in a method of doping silicon oxide with a metal element in the related art, a silicon oxide and a metal additive are each volatilized and mixed to prepare a metal-doped silicon oxide. However, due to the volatile temperature difference between the silicon oxide and the metal additive, there is a problem in that a difference in metal content occurs because it is difficult to achieve uniform doping due to a change in specific surface area caused by a difference in pressure and temperature and the exhaustion of the metal additive.

SUMMARY OF THE INVENTION

The present invention has been made in an effort to solve the above-described problems, and an object of the present invention to provide a silicon oxide preparation device capable of improving the amount of silicon oxide produced and a preparation method thereof because it is possible to continuously prepare silicon oxide by a liquid phase-solid phase reaction by introducing a silicon-based molded body into silicon molten metal.

An object of the present invention is to provide a preparation device and a preparation method, which are capable of preparing a silicon oxide uniformly doped with a metal in a single process by using a silicon-based molded body including the metal as a raw material.

Another object of the present invention is to provide a silicon oxide negative electrode material capable of improving the initial reversible efficiency and capacity of a lithium secondary battery.

A method for preparing silicon oxide according to the present invention is characterized by including: (a) introducing a silicon-based molded body including any two or more of silicon, silicon dioxide and a material including a metal element into a silicon molten metal; and (b) producing silicon oxide by a liquid phase-solid phase reaction of the silicon molten metal and the silicon-based molded body.

The material including the metal element is characterized by being any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof.

The silicon-based molded body is characterized in that the silicon and the silicon dioxide are mixed at a molar ratio of 1:0.25 to 1:4.

Step (a) is characterized in that a metal compound is further introduced into the silicon molten metal.

The silicon-based molded body is characterized by having a porosity of 5% to 65%.

The silicon-based molded body is characterized by having a molding density of 0.7 to 3.8 $g/cm^3$ and a true density of 2.1 to 4.0 $g/cm^3$.

The silicon-based molded body is characterized by having a moisture content of 20% or less.

Furthermore, the silicon-based molded body is characterized in that the value of [Equation 1] $\{A(D_{50})+B(D_{50})\}/\{C(D_{max})-C(D_{10})\}$ (provided that A is a raw material having a relatively large particle size before the silicon-based molded body is mixed, B is a raw material having a relatively small particle size before the silicon-based molded body is mixed, and C is a mixture of A and B) satisfies 5 or less.

The silicon oxide is characterized by being collected by any one method of deposition or capture.

A device for preparing silicon oxide according to the present invention is characterized by including: a container in which a silicon molten metal is prepared; a feeder for feeding a silicon-based molded body including any two or more of silicon, silicon dioxide and a material including a metal element into the container; and a collecting part for collecting silicon oxide produced by a liquid phase-solid phase reaction of the silicon molten metal and the silicon-based molded body in the container.

The material including the metal element is characterized by being any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof.

The silicon-based molded body is characterized in that the silicon and the silicon dioxide are mixed at a molar ratio of 1:0.25 to 1:4.

The feeder is characterized by further feeding a metal compound into the container.

The silicon-based molded body is characterized by having a porosity of 5% to 65%.

The silicon-based molded body is characterized by having a molding density of 0.7 to 3.8 $g/cm^3$ and a true density of 2.1 to 4.0 $g/cm^3$.

The silicon-based molded body is characterized by having a moisture content of 20% or less.

The silicon-based molded body is characterized in that the value of [Equation 1] $\{A(D_{50})+B(D_{50})\}/\{C(D_{max})-C(D_{10})\}$ (provided that A is a raw material having a relatively large particle size before the silicon-based molded body is mixed, B is a raw material having a relatively small particle size before the silicon-based molded body is mixed, and C is a mixture including A and B) satisfies 5 or less.

The collecting part is characterized in that the silicon oxide is collected by any one method of deposition or capture.

According to the present invention, an effect capable of improving the amount of silicon oxide produced can occur because a silicon-based molded body can be introduced into a silicon molten to continuously prepare silicon oxide by a liquid phase-solid phase reaction and simplify a preparation process.

Since silicon oxide can be uniformly doped with a metal using the silicon-based molded body including the metal as a raw material to simultaneously introducing the silicon-based molded body into the silicon molten metal by a single process, an effect of facilitating the control of a metal content in the metal oxide can occur.

An effect of providing a silicon oxide negative electrode material capable of improving the initial reversible efficiency and capacity of a lithium secondary battery can occur.

DETAILED DESCRIPTION

Figure 1:
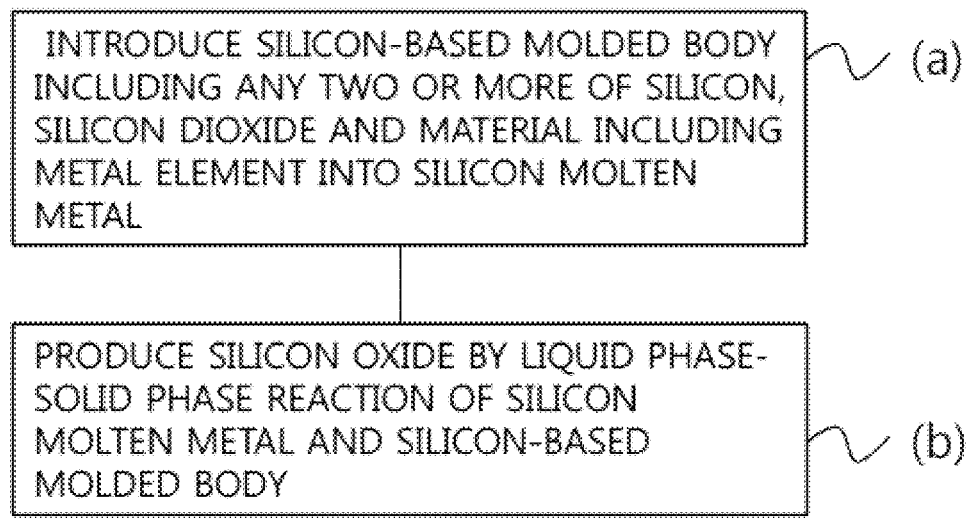
FIG. 1 is a flow-chart of the method for preparing silicon oxide according to the present invention.

The present invention will be described in detail as follows with reference to the accompanying drawings. Here, repeated descriptions and a detailed description of the known function and configuration which may unnecessarily obscure the gist of the present invention will be omitted. Exemplary embodiments of the present invention are provided to completely describe the present invention to a person with ordinary skill in the art. Therefore, the shape, size, and the like of elements in the drawings may be exaggerated for a clearer description.

Throughout the specification, when one part "includes" one constituent element, unless otherwise specifically described, this does not mean that another constituent element is excluded, but means that another constituent element may be further included.

Hereinafter, preferred examples for helping the understanding of the present invention will be suggested. However, the following examples are provided only to more easily understand the present invention, and the contents of the present invention are not limited by the following examples.

<Method for Preparing Silicon Oxide>

FIG. 1 is a flow-chart of the method for preparing silicon oxide according to the present invention. A method for preparing silicon oxide according to the present invention may include Steps (a) and (b).

Step (a) according to the present invention may introduce a silicon-based molded body including any two or more of silicon, silicon oxide and a material including a metal element into a silicon molten metal.

The silicon-based molded body may be a solid formed by various molding methods such as molding a silicon-based mixture in which any two or more of silicon, silicon oxide and a material including a metal element are mixed using a molding mold, drying a slurry, sintering a slurry and calcining a slurry, and may preferably be a mixture of silicon and silicon dioxide. The silicon-based molded body may be molded in various forms such as a tablet, a tube, a briquette, a pellet, a coin, a cylinder, a granule, a nugget and a chunk regardless of the form, and in addition, it can be used regardless of the form as long as the silicon-based molded body is a solid including silicon-based mixture particles.

The method for preparing a silicon-based molded body is as follows.

First, a silicon-based mixture is prepared by putting a raw material for a silicon-based molded body into a typical publicly-known mixer such as a pedal mixer, an extruder, a Banbury mixer, a kneader, and a mixing roll. In this case, when silicon and silicon dioxide are included as raw materials, the silicon-based mixture may be prepared by mixing silicon and silicon dioxide at a molar ratio of 1:0.25 to 1:4. Preferably, it is possible to prepare three silicon-based mixtures in which silicon and silicon dioxide are mixed at a molar ratio of 1:0.25, 1:1 and 1:4, respectively. For silicon and silicon dioxide, silicon oxide may be produced through the following Chemical Formula 1 by a stoichiometric reaction, and a silicon-based molded body having a different molar ratio may be introduced into a silicon molten metal according to the exhaustion of the raw materials during the reaction.

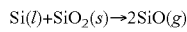  [Chemical Formula 1]

$$Si(l) + SiO_2(s) \rightarrow 2SiO(g) \quad \text{[Chemical Formula 1]}$$

When a silicon-based molded body is first introduced into silicon molten metal, a silicon-based molded body having a molar ratio of 1:1 may be introduced into the molten silicon so as to satisfy Chemical Formula 1. When more of the silicon molten metal is exhausted as the reaction progresses, the proportion of Si may be increased by introducing a silicon-based molded body in which silicon and silicon dioxide are mixed at a molar ratio of 1:0.25, and accordingly, a decrease in reaction rate may be prevented. In contrast, when more of the silicon-based molded body is exhausted as the reaction progresses, the proportion of $SiO_2$ may be increased by introducing a silicon-based molded body in which silicon and silicon dioxide are mixed at a molar ratio of 1:4, and accordingly, a decrease in reaction rate may be prevented.

When a material including a metal element is included in the silicon-based molded body, the material including the metal element may be any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof. Preferably, the material including the metal element may be any one or more of Mg-containing magnesium oxides, magnesium hydroxides, magnesium silicides, magnesium silica oxides, magnesium nitrides, magnesium oxynitrides, magnesium carbides or magnesium carboxides. When the material including the metal element is included in the silicon-based molded body, it is possible to continuously produce a large amount of a metal-doped silicon oxide without another additional device or subsequent process because metal-doped silicon oxides may be prepared in a single process. Therefore, it is possible to continuously produce a large amount of metal-doped silicon oxide having a uniform metal content and excellent quality.

Next, a silicon-based molded body may be prepared by filling a molding mold with a mixed silicon-based mixture to mold the mixed silicon-based mixture so as have a porosity of 5% to 65%. There may occur problems in that when the silicon-based mixture is molded so as to have a porosity of less than 5%, a residue may remain in the molding mold or the silicon-based molded body may crack and when the silicon-based mixture is molded so as to have a porosity of more than 65%, the silicon-based molded body does not maintain the morphology due to the low strength thereof, and thus cannot be used for the preparation of silicon oxide. Such a silicon-based molded body may be present because the silicon-based mixture is aggregated and agglomerated, and satisfied a strength of 2 $N/mm^2$ or more. Further, the silicon-based molded body was found to have a molding density of 0.7 to 3.8 $g/cm^3$, a true density of 2.1 to 4.0 $g/cm^3$ and a specific surface area of 30 to 400 $m^2/g$. In addition, the silicon-based molded body satisfied a moisture content of 20% or less. When the silicon-based molded body has a moisture content of more than 20%, the amount of moisture contained is increased, so that an oxidation problem due to moisture may occur when silicon oxide is prepared. In addition, the value of [Equation 1] $\{A(D_{50})+B(D_{50})\}/\{C(D_{max})-C(D_{10})\}$ (provided that A is a raw material having a relatively large particle size before the silicon-based molded body is mixed, B is a raw material having a relatively small particle size before the silicon-based molded body is mixed, and C is a mixture including A and B) by the particle size of the mixed raw material of the silicon-based molded body may satisfy 5 or less. In [Equation 1], the larger the particle size distribution deviation $\{C(D_{max})-C(D_{10})\}$ is compared to the size of the total median particle size $\{A(D_{50})+B(D_{50})\}$ of the mixed raw material, the more compact the pores of the powder molded body become, the strength and shape retention rate are increased because it is advantageous to secure moldability, and when the value of [Equation 1] exceeds 5, there may occur a problem in that it is difficult to prepare a silicon-based molded body because the particle size of the raw material is large and the deviation is small.

Meanwhile, in Step (a) according to the present invention, a metal compound may be further introduced into a silicon molten metal. When a metal compound is additionally introduced into a silicon molten metal together with a silicon-based molded body, the initial efficiency may be improved due to metal doping. Here, the metal compound may be any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof. Preferably, the metal compound may be any one or more of a magnesium oxide, a magnesium hydroxide, a magnesium silicide, a magnesium silica oxide, a magnesium nitride, a magnesium oxynitride, a magnesium carbide or a magnesium carboxide, which is a compound including Mg, and may be introduced in the form of a powder, a molded body, a slurry, and the like.

In Step (b) according to the present invention, a silicon oxide may be produced by a liquid phase-solid phase reaction of a silicon molten metal and a silicon-based molded body.

The silicon molten metal may be prepared at a temperature of 1,400 to 1,800° C. There may occur problems in that when the temperature is less than 1,400° C., the silicon molten metal is not formed because silicon is not melted, and when the temperature exceeds 1,800° C., the time to reach a target temperature, the temperature rise time to maintain the target temperature, and the cooling time to reach the end of the process become very long due to the high insulation effect.

The silicon molten metal and the silicon-based molded body are subjected to a liquid phase-solid phase reaction, and the reaction contact between the silicon molten metal and the silicon-based molded body may be continuously maintained. Silicon oxide may be produced by a liquid phase-solid phase reaction in a silicon molten metal. Even when the silicon-based molded body is present at the interface of the silicon molten metal, molten silicon may permeate into the internal pores of the silicon-based molded body due to the capillary phenomenon to produce silicon oxide.

The liquid phase-solid phase reaction is free to control the process temperature and pressure, so that it is possible to prepare a silicon-based molded body having an oxidation value (x value) of silicon oxide (SiOx) of 1.0 or less using the vapor pressure of silicon.

The silicon oxide produced by the liquid phase-solid phase reaction may be collected by a method of deposition or capture.

In an exemplary embodiment, the silicon oxide may be deposited and collected on a substrate at a deposition temperature of 500 to 1,200° C. There may occur problems in that when the deposition temperature is less than 500° C., the produced silicon oxide is rapidly cooled, and thus may be attached to nanoparticles having a very high specific surface area, and when the deposition temperature exceeds 1,200° C., the charge and discharge capacity retention rate is lowered when silicon oxide is used as a lithium secondary battery negative electrode material because deposited silicon oxide experiences an additional heat treatment on a substrate to excessively grow silicon crystal grains.

In other exemplary embodiment, the silicon oxide may be captured by a capturer and collected.

<Silicon Oxide Preparation Device>

Figure 2:
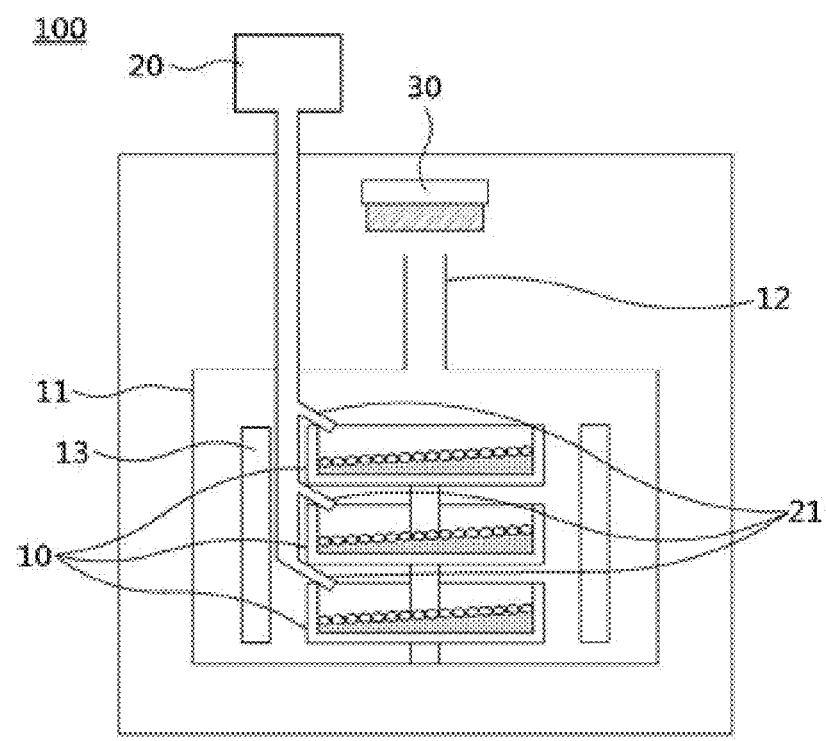
FIG. 2 is a cross-sectional view of a silicon oxide preparation device 100 according to an exemplary embodiment of the present invention.
Figure 3:
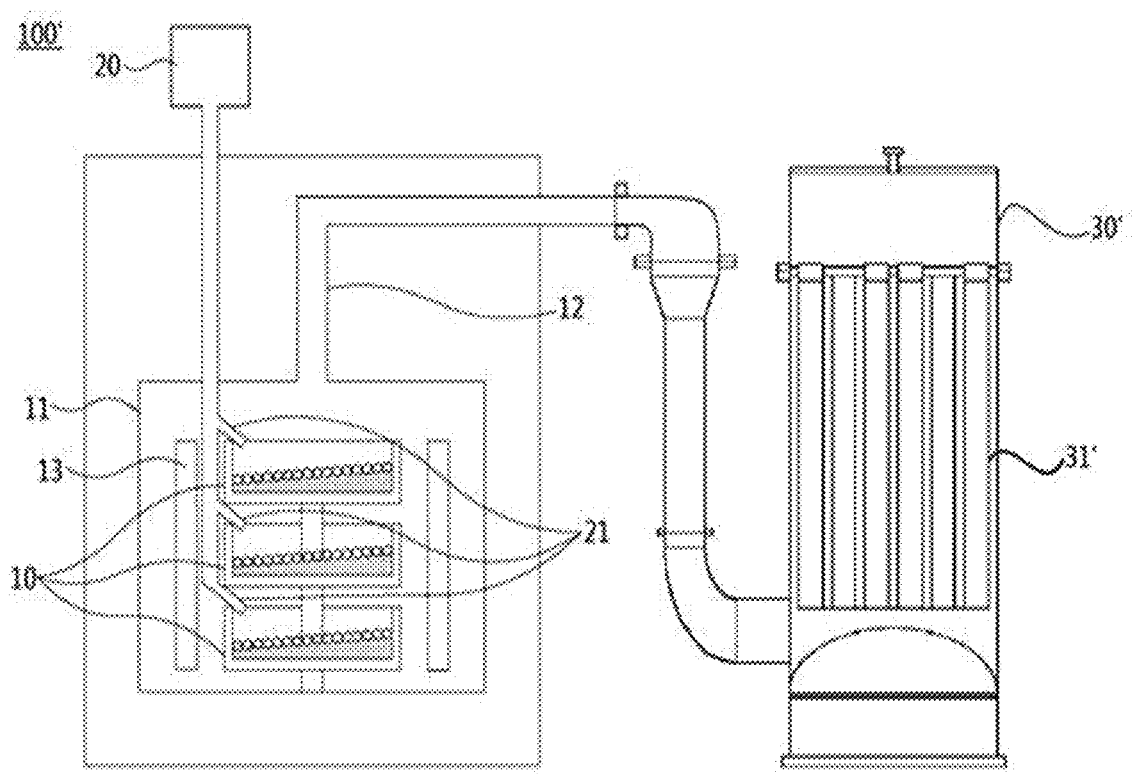
FIG. 3 is a cross-sectional view of a silicon oxide preparation device 100' according to another exemplary embodiment of the present invention.

FIGS. 2 and 3 are cross-sectional views of the silicon oxide preparation device 100, 100' according to the present invention. Referring to FIGS. 2 and 3, the silicon oxide preparation device 100, 100' according to the present invention may include a container 10, a feeder 20 and a collecting part 30, 30'.

The container 10 according to the present invention may provide a space for accommodating a silicon molten metal.

There are one or more containers 10, and the container may be stacked in multiple stages in the vertical direction by setting the height of the container 10 low. When the container 10 is stacked in multiple stages, the space for accommodating the raw material is widened to increase a reaction area, so the amount of silicon oxide produced may be improved. For the container 10, a material such as graphite or quartz may be used, and the material is not particularly limited, but preferably, a container 10 made of graphite may be used.

A reacting part 11 may be formed at the outer side of the container 10. The reacting part 11 may provide a space capable of temporarily accommodating produced silicon oxide before collecting the produced silicon oxide in a collecting part 30, 30' to be described below. Further, since a discharge part 12 is formed on one side of the reacting part 11, the silicon oxide may be discharged to the collecting part 30, 30'.

The container 10 may be heated by a heater 13. In this case, a silicon molten metal may be prepared by setting the temperature of the heater 13 to be equal to or higher than the melting point of silicon. Preferably, the container 10 may be prepared at a temperature of 1,400 to 1,800° C. There may occur problems, in which when the temperature is less than 1,400° C., the silicon molten metal is not formed because silicon is not melted, and when the temperature exceeds 1,800° C., the time to reach a target temperature, the temperature rise time to maintain the target temperature, and the cooling time to reach the end of the process become very long due to the high insulation effect.

The feeder 20 according to the present invention may feed a silicon-based molded body to the silicon molten metal formed in the container 10.

The silicon-based molded body may be a solid formed by various molding methods such as molding a silicon-based mixture in which any two or more of silicon, silicon oxide and a material including a metal element are mixed using a molding mold, drying a slurry, sintering a slurry and calcining a slurry, and may preferably be a mixture of silicon and silicon dioxide. The silicon-based molded body may be molded in various forms such as a tablet, a tube, a briquette, a pellet, a coin, a cylinder, a granule, a nugget and a chunk regardless of the form. In addition, by using a heavy molded body instead of a light powder form, it is possible to prevent a phenomenon in which the raw material is dispersed to the outside of the container 10 when the raw material is fed, and an effect capable of quickly and continuously feeding the raw material into the container 10 may occur.

When silicon and silicon dioxide are included in the silicon-based molded body, it is possible to use a silicon-based molded body in which silicon and silicon dioxide are mixed at a molar ratio of 1:0.25 to 1:4. Preferably, it is possible to use three silicon-based molded bodies in which silicon and silicon dioxide are mixed at a molar ratio of 1:0.25, 1:1 and 1:4, respectively. For silicon and silicon dioxide, silicon oxide may be produced through the following Chemical Formula 1 by a stoichiometric reaction, and a silicon-based molded body having a different molar ratio may be introduced into silicon molten metal according to the exhaustion of the raw materials during the reaction.

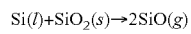

$$Si(l)+SiO_2(s) \rightarrow 2SiO(g) \quad \text{[Chemical Formula 1]}$$

When a silicon-based molded body is first introduced into silicon molten metal, a silicon-based molded body having a molar ratio of 1:1 may be introduced into the molten silicon so as to satisfy Chemical Formula 1. When more of the silicon molten metal is exhausted as the reaction progresses, the proportion of Si may be increased by introducing a silicon-based molded body in which silicon and silicon dioxide are mixed at a molar ratio of 1:0.25, and accordingly, a decrease in reaction rate may be prevented. In contrast, when more of the silicon-based molded body is exhausted as the reaction progresses, the proportion of $SiO_2$ may be increased by introducing a silicon-based molded body in which silicon and silicon dioxide are mixed at a molar ratio of 1:4, and accordingly, a decrease in reaction rate may be prevented.

When a material including a metal element is included in the silicon-based molded body, the material including the metal element may be any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof. Preferably, the silicon-based mixture may be any one or more of Mg-containing magnesium oxides, magnesium hydroxides, magnesium silicides, magnesium silica oxides, magnesium nitrides, magnesium oxynitrides, magnesium carbides or magnesium carboxides. When a metal element is included in the silicon-based molded body, it is possible to continuously produce a large amount of a metal-doped silicon oxide without another additional device or subsequent process because metal-doped silicon oxides may be prepared in a single process. Therefore, it is possible to continuously produce a large amount of metal-doped silicon oxide having a uniform metal content and excellent quality.

Next, a silicon-based molded body may be prepared by filling a molding mold with a mixed silicon-based mixture to mold the mixed silicon-based mixture so as have a porosity of 5% to 65%. There may occur problems in that when the silicon-based mixture is molded so as to have a porosity of less than 5%, a residue may remain in the molding mold or the silicon-based molded body may crack and when the silicon-based mixture is molded so as to have a porosity of more than 65%, the silicon-based molded body does not maintain the morphology due to the low strength thereof, and thus cannot be used for the preparation of silicon oxide. Such a silicon-based molded body may be present because the silicon-based mixture is aggregated and agglomerated, and satisfied a strength of 2 $N/mm^2$ or more. Further, the silicon-based molded body was found to have a molding density of 0.7 to 3.8 g/cm³, a true density of 2.1 to 4.0 g/cm³ and a specific surface area of 30 to 400 m²/g. In addition, the silicon-based molded body satisfied a moisture content of 20% or less. When the silicon-based molded body has a moisture content of more than 20%, the amount of moisture contained is increased, so that an oxidation problem due to moisture may occur when silicon oxide is prepared. In addition, the value of [Equation 1] $\{A(D_{50})+B(D_{50})\}/\{C(D_{max})-C(D_{10})\}$ (provided that A is a raw material having a relatively large particle size before the silicon-based molded body is mixed, B is a raw material having a relatively small particle size before the silicon-based molded body is mixed, and C is a mixture including A and B) by the particle size of the mixed raw material of the silicon-based molded body may satisfy 5 or less. In [Equation 1], the larger the particle size distribution deviation $\{C(D_{max})-C(D_{10})\}$ is compared to the size of the total median particle size $\{A(D_{50})+B(D_{50})\}$ of the mixed raw material, the more compact the pores of the molded body become, the strength and shape retention rate are increased because it is advantageous to secure moldability, and when the value of [Equation 1] exceeds 5, there may occur a problem in that it is difficult to prepare a silicon-based molded body because the particle size of the raw material is large and the deviation is small.

The feeder 20 may continuously feed the silicon-based molded body to the silicon molten metal on the container 10 through a feeding pipe 21. A feeding pipe 21 may be provided for each of the containers 10 stacked in multiple stages to feed the silicon-based molded body In other words, by providing a feeding pipe 21 corresponding to each container 10, raw materials may be simultaneously fed to each container 10, and an effect of facilitating installation may occur.

The feeder 20 may further feed the metal compound to the inside of the container 10 together with the silicon-based molded body. When the metal compound is additionally fed, the metal doping content may be increased when silicon oxide is prepared. Here, the metal compound may be any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof. Preferably, the metal compound may be any one or more of a magnesium oxide, a magnesium hydroxide, a magnesium silicide, a magnesium silica oxide, a magnesium nitride, a magnesium oxynitride, a magnesium carbide or a magnesium carboxide, which includes Mg, and may be introduced in the form of a powder, a molded body, a slurry, and the like.

The collecting part 30, 30' according to the present invention may collect silicon oxide produced by a liquid phase-solid phase reaction of a silicon molten metal and a silicon-based molded body.

When a silicon-based molded body molded to have a porosity of 5% to 65% is introduced into a silicon molten metal, silicon oxide is produced at a rate of 0.5 kg/min·m² or more, and may be collected by a method of deposition or capture.

Referring to FIG. 2, the collecting part 30 according to an exemplary embodiment of the present invention may collect silicon oxide by depositing the silicon oxide. The collecting part 30 may deposit silicon oxide produced on a substrate disposed on the upper portion of the discharging part 12. The silicon oxide may be deposited and collected on the collecting part 30 at a deposition temperature of 500 to 1,200° C.

There may occur problems in that when the deposition temperature is less than 500° C., the produced silicon oxide is rapidly cooled, and thus may be attached to nanoparticles having a very high specific surface area, and when the deposition temperature exceeds 1,200° C., the charge and discharge capacity retention rate is lowered when silicon oxide is used as a lithium secondary battery negative electrode material because deposited silicon oxide experiences an additional heat treatment in a collecting part 30 to excessively grow silicon crystal grains.

Referring to FIG. 3, the collecting part 30' according to another exemplary embodiment of the present invention may collect silicon oxide discharged from the discharging part 12 by capturing the silicon oxide on a capturing machine equipped with a capturing stand.

The silicon oxide prepared by the silicon oxide preparation method and the silicon oxide preparation device according to the present invention may be used as a material for a negative electrode of a lithium secondary battery.

As a result of measuring the x value of the prepared silicon oxide (SiOx) by an X-ray photoelectron spectroscopy (XPS) analysis and an energy dispersive X-ray spectroscopy analysis (EDXS) of a scanning electron microscope device, the x value may be 0.6 to 1.1. When the x value is less than 0.6, there may occur a problem in that the volume expansion becomes very large when silicon oxide is used as a negative electrode material for a lithium secondary battery, and when the x value exceeds 1.1, there may occur a problem in that the initial reversible efficiency of the lithium secondary battery is lowered.

When silicon oxide is prepared using a silicon-based molded body including a metal element, a metal-doped silicon oxide represented by $M_aSi_bO_c$ or $M_aM'_aSibO_c$ may be prepared. M and M' may be selected from Mg, Li, Ca, Na, Al, Ti, K, Be, Zn, Mn, Cr, Fe, Co, Mo, Ni, Cu, Y, V, Zr, Nb, Rb, Cs and the like, which are metal elements that have a high capacity and can reduce silicon oxide when bonded to silicon oxide. In this case, a or a+a' is 1 to 8, b is 1 to 4, and c is 3 to 20. When a or a+a' is less than 1, ionic conductivity and electrical conductivity are not significantly improved, and when a or a+a' exceeds 8, crystallization may deteriorate. When b is less than 1, the capacity of a lithium secondary battery is not significantly increased, and when b exceeds 4, ionic conductivity and electrical conductivity may be decreased. When c is less than 3, the crystallization of $M_aSi_bO_c$ or $M_aM'_aSi_bO_c$ may deteriorate, and when $M_aSi_bO_c$ or $M_aM'_aSi_bO_c$ exceeds 20, the storage capacity of lithium ions may be reduced.

When the silicon oxide prepared according to the present invention is applied as a negative electrode material for a lithium secondary battery, the following electrochemical characteristics are implemented.

An initial reversible efficiency that is a ratio (D/C) of a capacity (D) by which a silicon oxide negative electrode material is lithium-dealloyed at a constant current up to 1.5 V to a capacity (C) by which a silicon oxide electrode material is lithium-alloyed at a constant current and a constant voltage of up to 0.005 V using lithium metal as an opposite pole is implemented to be 75% or more.

A capacity by which the silicon oxide negative electrode material is lithium-alloyed at the constant current and the constant voltage of up to 0.005 V using lithium metal as the opposite pole and then is lithium-dealloyed at the constant current up to 1.5 V is implemented to be 1,250 mAh/g to 2,350 mAh/g.

Example 1

The silicon oxide prepared by the silicon oxide preparation method and the silicon oxide preparation device according to the present invention was prepared as follows.

First, a mixture was prepared by homogeneously mixing silicon, silica and magnesium silicate, which is a magnesium based material, using a powder mixer. In this case, the mixed molar ratio of silicon and silica in the entire mixture raw material including magnesium silicate is 1:1.

Next, the mixture was molded so as to have a porosity of 15% by filling a molding mold with the mixture, thereby preparing a molded body.

And then, silicon oxide was prepared by continuously introducing the molded body into a silicon molten metal container at 1,600° C. for 1 hour in a vacuum chamber using a feeder.

Finally, a silicon oxide including magnesium was obtained by condensing the prepared silicon oxide on a deposition plate.

Example 2

A silicon oxide was prepared under the same conditions as those in Example 1, except that the mixture was molded so as to have a porosity of 29%.

Example 3

A silicon oxide was prepared under the same conditions as those in Example 1, except that the mixture was molded so as to have a porosity of 38%.

Example 4

A silicon oxide was prepared under the same conditions as those in Example 1, except that the mixture was molded so as to have a porosity of 58%.

Example 5

A silicon oxide was prepared under the same conditions as those in Example 1, except that the mixture was molded so as to have a porosity of 64%.

Example 6

A silicon oxide was prepared under the same conditions as those in Example 1, except that the mixed raw material was changed into silicon, silica and a silicon-based material and the mixture was molded so as to have a porosity of 64%.

Example 7

A silicon oxide was prepared under the same conditions as those in Example 1, except that the mixed raw material was changed to have a mixed molar ratio of silicon and silica of 1:4.

Example 8

A silicon oxide was prepared under the same conditions as those in Example 1, except that the mixed raw material was changed to have a mixed molar ratio of silicon and silica of 1:0.25.

Comparative Example 1

A silicon oxide was prepared under the same conditions as those in Example 1, except that the mixture was molded so as to have a porosity of less than 5%.

Comparative Example 2

A silicon oxide was prepared under the same conditions as those in Example 1, except that the mixture was molded so as to have a porosity of 70% or more.

Comparative Example 3

A silicon oxide was prepared under the same conditions as those in Example 1, except that the molded body was introduced in the absence of the silicon molten metal.

TABLE 1

| Classification | Example 1 | Example 2 | Example 3 | Example 4 | Example 5 | Example 6 | Example 7 | Example 8 |
| --- | --- | --- | --- | --- | --- | --- | --- | --- |
| Porosity (%) | 15 | 29 | 38 | 58 | 64 | 5 | 29 | 29 |
| Silicon molten metal | ◯ | ◯ | ◯ | ◯ | ◯ | ◯ | ◯ | ◯ |
| Added material | Mg-based | Mg-based | Mg-based | Mg-based | Mg-based | Si-based | Mg-based | Mg-based |
| Mixed molar ratio of Si:SiO$_2$ | 1:1 | 1:1 | 1:1 | 1:1 | 1:1 | 1:1 | 1:4 | 1:0.25 |
| Molding density (g/cm$^3$) | 1.87 | 1.56 | 1.35 | 0.92 | 0.78 | 2.08 | 1.56 | 1.56 |
| True density (g/cm$^3$) | 2.19 | 2.19 | 2.19 | 2.19 | 2.19 | 2.19 | 2.19 | 2.19 |
| Strength (N/mm$^2$) | 7.6 | 4.9 | 4.1 | 2.9 | 2.3 | — | 4.9 | 4.9 |
| Specific surface area (m$^2$/g) | 315 | 313 | 338 | 329 | 379 | 35 | 313 | 313 |
| Production speed (kg/min · m$^2$) | 0.39 | 0.86 | 1.01 | 1.06 | 1.07 | 0.15 | 0.23 | 0.21 |

TABLE 2

| Classification | Comparative Example 1 | Comparative Example 2 | Comparative Example 3 |
|---|---|---|---|
| Porosity (%) | Less than 5 | 70 or more | 29 |
| Silicon molten metal | ○ | ○ | X |
| Added material | Mg-based | Mg-based | Mg-based |
| Mixed molar ratio of Si:SiO$_2$ | 1:1 | 1:1 | 1:1 |
| Molding density (g/cm$^3$) | 1.94 | — | 1.56 |
| True density (g/cm$^3$) | — | — | 2.19 |
| Strength (N/mm$^2$) | — | — | 4.9 |
| Specific surface area (m$^2$/g) | — | — | 313 |
| Production speed (kg/min·m$^2$) | — | — | 0.05 |

Table 1 is a table showing the characteristics of the silicon-based molded body according to the Examples and the production rate of the silicon oxide using the silicon-based molded body as a raw material, and Table 2 is a table showing the characteristics of the silicon-based molded body according to the Comparative Examples and the production rate of the silicon oxide using the silicon-based molded body as a raw material. The porosity, molding density, true density, strength and specific surface area, which are the characteristics of the silicon-based molded body were determined using the following methods.

The molding density of the silicon-based molded body is an average value of the apparent densities immediately after molding, and the apparent density of a molded body in the form of a cylinder was calculated by the following Equation 2. The apparent density was calculated by the following Equation 2 after measuring the diameter (A), height (B), and weight (C).

$$C \div \left\{ \left(\frac{A}{2}\right)^2 \times \pi \times B \right\}$$ [Equation 2]

(provided that A = diameter, B = height, C = weight)

In this case, the molding density was calculated by selecting 50 molded arbitrary silicon-based molded bodies to confirm the apparent density, and using the average value of each density. As a result of confirming the molding density of the silicon-based molded body through Table 1, it can be confirmed that the molding density value satisfies 0.7 to 3.8 g/cm$^3$ in the case of the Examples.

The true density of the silicon-based molded body was confirmed by a density measuring device (AccPyc II 1340 manufactured by Micromeritics, Inc.), and the principle of measuring the true density is as follows. For the true density, based on Boyle's law that the pressure of a certain amount of gas contained in a certain container is inversely proportional to the volume, the pressure that changes is measured when helium gas is injected into a space with a sample and the volume of the space is changed. In this case, the true density is measured by applying the ideal gas state equation (PV=nRT) to calculate the density from the volume of only the sample excluding the empty space such as pores of the molded body. The true density was measured in accordance with the ASTM C 604 standard. In this case, the measurement conditions of the true density were a gas rate of 0.1 psi·g/min at room temperature, and the true density was measured after filling a volume that is equal to or more than the half of a measuring container (a cylindrical container with a diameter of 1.8 cm and a height of 4 cm) of a density measuring device during the measurement at one time, and was calculated as an average value of values repeatedly measured six or more times. As a result of confirming the true density of the silicon-based molded body through Table 1, it can be confirmed that the true density value satisfies 2.1 to 4.0 g/cm$^3$ in the case of the Examples.

The porosity of the silicon-based molded body can be obtained using the molding density and the true density, and was calculated through the following Equation 3.

$$(B - A) \div B \times 100$$ [Equation 3]

(provided that A = molding density and B = true density)

Since the true density is a density of only a pure raw material excluding the empty space in the molding raw material and the molding density is an apparent density including pores in the molding raw material, the proportion of pores can be confirmed by the above equation. As a result of confirming the porosity of the silicon-based molded body through Table 1, it can be confirmed that the porosity value satisfies 5% to 65% in the case of the Examples.

The strength of the silicon-based molded body was measured by a compression test of a universal material tester (AG-Xplus 100 kN manufactured by Shimadzu), and the displacement distance and load were measured by applying pressure according to the time. In this case, the specification of the strength analysis tester complied with ISO 7500-1, and a specimen was manufactured by the specimen specification of ASTM D 3410, which is the strength test specification for polymer composite materials. The maximum load that the molding raw material can withstand was confirmed depending on the presence or absence of cracks or cracking noise on the molded body or the position where an inflection point in a graph occurs, and the strength was confirmed by dividing the maximum load by a contact area. At least five specimens were prepared and tested during analysis under the same conditions in a form processed so as to have a constant square cross section.

The specific surface area of the silicon-based molded body was confirmed by a specific surface area measuring device (TriStar II 3020 manufactured by Micromeritics), and was analyzed in the bulk form of the molding raw material as it was. The specific surface area measuring device is a device by a method of calculating the specific surface area by adsorbing nitrogen gas on the surface of a sample and measuring the amount of nitrogen gas adsorbed, and the measurement accuracy of the device is ±0.05 mmHg in the entire range and the linearity is ±0.5%. A specific surface area was measured in accordance with the ISO 9277 standard. The sample was dried at 250° C. for 2 hours by a pretreatment process before the analysis of a surface area, and then about 1 g of the sample was analyzed once at room temperature.

The production rate of silicon oxide using a silicon-based molded body as a raw material can be obtained as a time to inject 1 kg of a silicon-based molded body into a silicon molten metal in a vacuum chamber using a feeder and completely remove the silicon-based molded body, and was calculated by the following Equation 4.

$$C \div (A \times B)$$

$$\begin{pmatrix} \text{provided that } A = \text{silicon molten metal area,} \\ B = \text{time to volatilize silicon-based molded body, and} \\ C = \text{amount of silicon-based molded body fed} \end{pmatrix}$$

[Equation 4]

The area of the container equipped with the silicon molten metal was 2920 cm$^2$, the amount of silicon-based molded body fed was equally fixed at 1 kg, and the production rate was calculated by measuring the volatilization time. The criteria by which the molding raw material was completely vaporized and removed was confirmed by the unaided eye, and there may be a measurement error of ±5%. As a result of confirming the production rate of silicon oxide through Table 1, it can be confirmed that the production rate value satisfies 0.1 kg/min·m$^2$ or more in the case of the Examples. In contrast, in the case of Comparative Example 3, a silicon-based molded body having the same specifications as in Example 2 was used, but since solid silicon and the silicon-based molded body react with each other instead of the silicon molten metal, it can be confirmed that silicon oxide is produced at a low rate of 0.05 kg/min·m$^2$ because the reaction is slow due to a solid phase-solid phase reaction.

Figure 4:
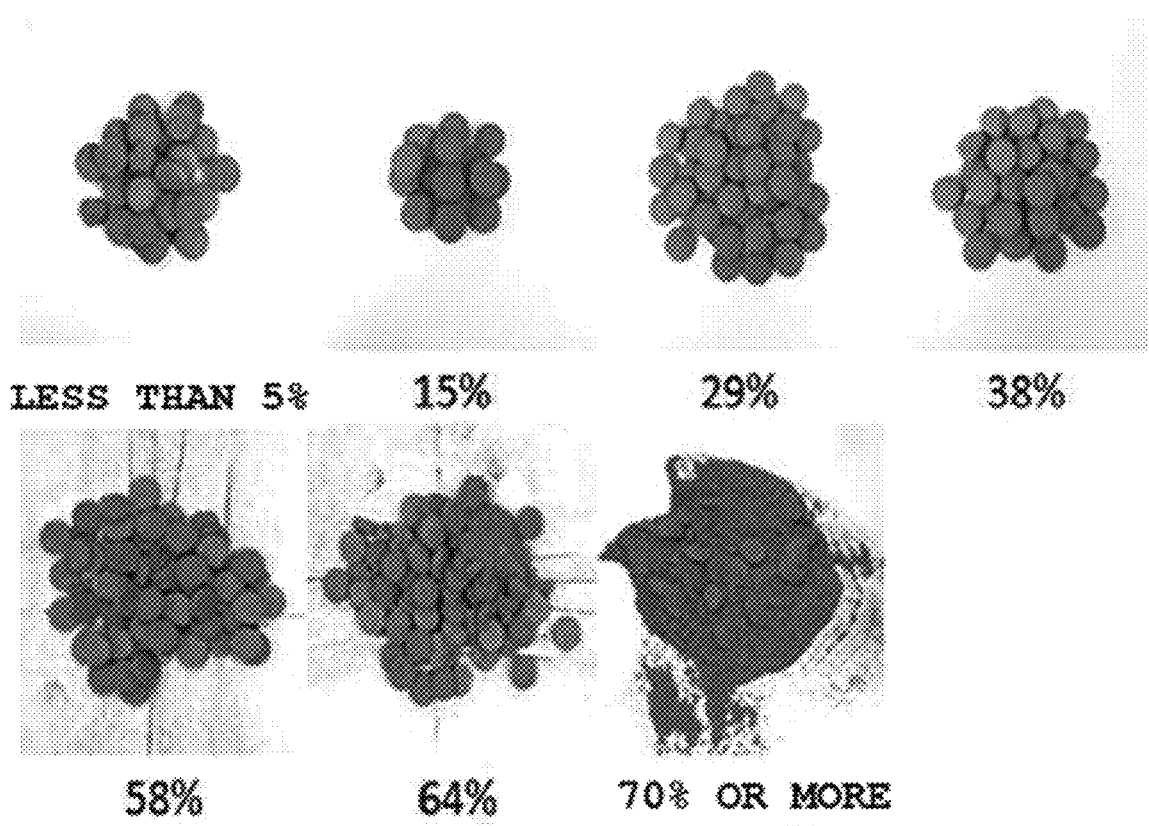
FIG. 4 is a set of photographs of a silicon-based molded body at each porosity.

FIG. 4 is a set of photographs of a silicon-based molded body at each porosity, and referring to FIG. 4, it can be confirmed that when a silicon-based molded body is prepared by molding a silicon-based mixture so as to have a porosity of 5% to 65%, the silicon-based molded body can be used for the preparation of silicon oxide because the silicon-based molded body is not cracked and characteristics thereof are maintained. When the silicon-based mixture of Comparative Example 1 is molded so as to have a porosity of less than 5%, the molded body is cracked, and when silicon-based mixture of Comparative Example 2 is molded so as to have a porosity of 70% or more, the specification cannot be determined because the form of the molded body is not maintained, and the mixture is in the form of a powder because the molded body is not prepared, so that it can be confirmed that the silicon-based mixtures of the Comparative Examples cannot be used when silicon oxide is prepared because a problem of raw material scattering may occur. In addition, when Example 2 is compared with Comparative Example 3, it can be confirmed that when silicon oxide is prepared by making the characteristics of the silicon-based molded body the same, the production rate of silicon oxide is faster than the rate at which solid silicon and the silicon-based molded body react with each other, when the silicon-based molded body is introduced into the silicon molten metal.

Figure 5A:
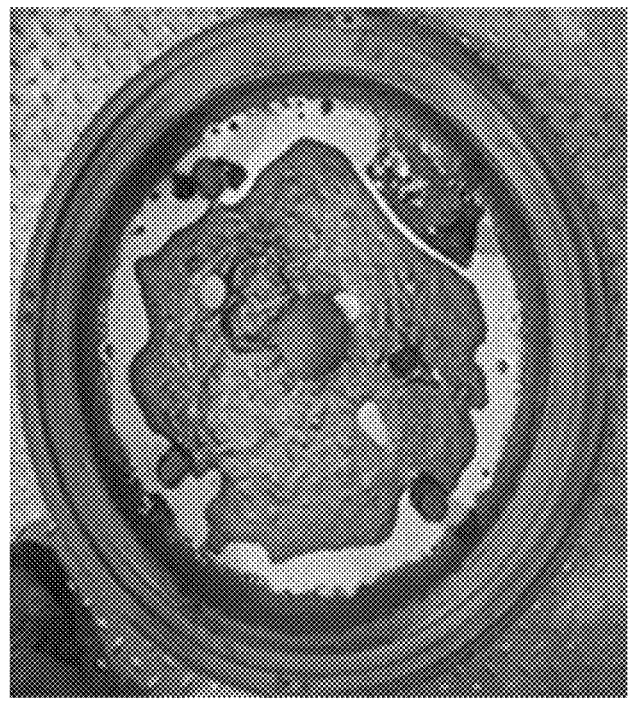
FIGS. 5A and 5B are a set of photographs illustrating the residue of the remaining silicon molten metal in a container during the preparation of silicon oxide.
Figure 5B:
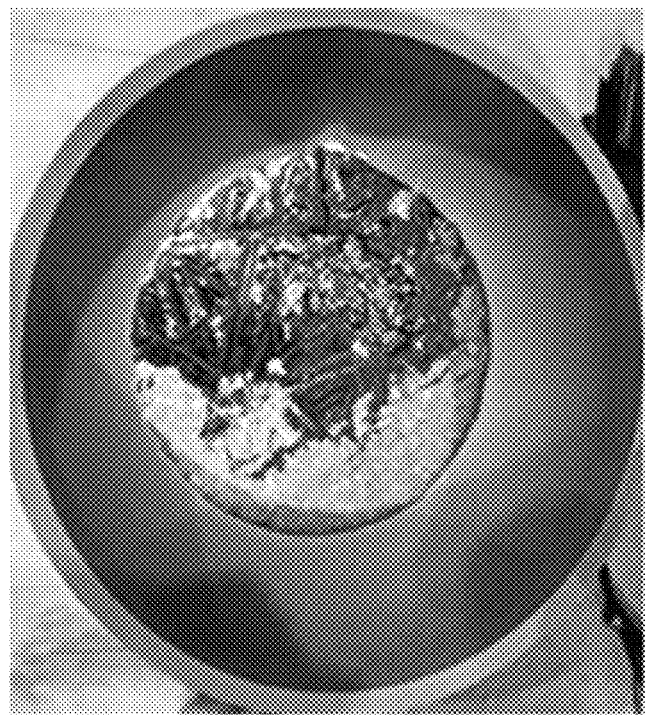

FIGS. 5A and 5B are a set of photographs illustrating the residue of the remaining silicon molten metal in a container during the preparation of silicon oxide, FIG. 5A is a photograph in which a small amount of the silicon molten metal is exhausted, and FIG. 5B is a photograph in which a large amount of the silicon molten metal is exhausted. Referring to FIG. 5A, since a small amount of the silicon molten metal is exhausted, silicon oxide may be continuously prepared using Example 7 in which the mixed molar ratio of Si:SiO$_2$ with a higher molar ratio of silica is 1:4, and the production rat of silicon oxide in this case is found to be 0.23 kg/min·m$^2$. Referring to FIG. 5B, since a large amount of the silicon molten metal is exhausted, silicon oxide may be continuously prepared using Example 8 in which the mixed molar ratio of Si:SiO$_2$ with a higher molar ratio of silicon is 1:0.25, and the production rat of silicon oxide in this case is found to be 0.21 kg/min·m$^2$.

The following Table 3 is a table showing the results of [Equation 1] showing the moldability according to the difference in particle size of the silicon-based molded body raw material and the results of the moisture according to the difference in particle size of the silicon-based molded body raw material. Here, Raw Material A is a powder having a relatively large particle size among the raw materials of the silicon-based molded body, Raw Material B is a powder having a relatively small particle size among the raw materials of the silicon-based molded body, Mixture C is a mixture including Raw Material A and Raw Material B, and E indicates a $\{A(D_{50})+B(D_{50})\}/\{C(D_{max})-C(D_{10})\}$ value as the result value of [Equation 1]. The larger the particle size distribution deviation $\{C(D_{max})-C(D_{10})\}$ value of mixture C is compared to the size of the total median particle size $\{A(D_{50})+B*(D_{50})\}$ of the mixed raw materials A and B of [Equation 1], the more compact of the pores of the powder molded body become, so that it may be advantageous to secure the moldability of the silicon-based molded body.

TABLE 3

| Particle size (μm) | Raw material A $D_{50}$ | Raw material B $D_{50}$ | Mixture C $D_{10}$ | $D_{max}$ | E | Moldability | Moisture content (%) |
|---|---|---|---|---|---|---|---|
| Experimental Example 1 | 15.2 | 0.02 | 4.12 | 31.4 | 0.56 | ○ | 0.3 |
| Experimental Example 2 | 13.4 | 4.83 | 2.68 | 27.5 | 0.73 | ○ | 12 |
| Experimental Example 3 | 9.64 | 5.41 | 2.18 | 16.4 | 1.06 | ○ | 11 |
| Experimental Example 4 | 15.2 | 13.4 | 9.23 | 31.8 | 1.27 | ○ | 6 |
| Experimental Example 5 | 24.3 | 12.7 | 9.89 | 27.1 | 2.15 | ○ | 18 |
| Experimental Example 6 | 18.8 | 16.8 | 13.1 | 21.4 | 4.29 | Δ | 9 |
| Experimental Example 7 | 24.3 | 22.8 | 18.1 | 27.3 | 5.12 | X | 16 |

Referring to Table 3, it can be confirmed that Experimental Examples 1 to 5 have a small E value, and thus excellent strength and shape retention rate during the preparation of the raw material molded body. In Experimental Example 6, since the particle size distribution deviation is small, a molded body whose powder is partially mixed may be prepared because an E value is close to 5, but the molded body can be used by sieving filtration. In Experimental Example 7, it can be confirmed that due to the large particle size and the small particle size distribution deviation, the E value exceeds 5, making it difficult to prepare a silicon-based molded body. The moisture content can be obtained using the weight of the silicon-based molded body at 25° C. before drying and the weight of the silicon-based molded body after drying at 200° C. for 24 hours, and was calculated by the following Equation 5.

$$(A - B) \div A \times 100 \quad [\text{Equation 5}]$$

$$\left( \begin{array}{c} \text{provided that } A = \text{the weight of the silicon-based} \\ \text{molded by body at 25° C. before drying, and } B = \text{the} \\ \text{weight of the silicon-based molded body after} \\ \text{drying at 200° C. for 24 hours} \end{array} \right)$$

As a result of confirming the moisture content of the silicon-based molded body from Table 3, it can be confirmed that the moisture content satisfies 20% or less in the case of the Experimental Examples, and accordingly, the possibility of oxidation of the silicon-based molded body by moisture may be reduced.

Although the present invention has been described with reference to preferred exemplary embodiments of the present invention, it is to be understood by a person with ordinary skill in the art that the present invention may be modified and changed in various ways without departing from the spirit and scope of the present invention described in the following claims.

What is claimed is:

1. A method for preparing silicon oxide, the method comprising:
   (a) introducing a silicon-based molded body comprising any two or more of silicon, silicon dioxide and a material comprising a metal element into a silicon molten metal; and
   (b) producing silicon oxide by a liquid phase-solid phase reaction of the silicon molten metal and the silicon-based molded body.

2. The method of claim 1, wherein the material comprising the metal element is any one or more metals selected from the group consisting of Mg, Li, Ca, Na, Al, Ti, K, Be, Zn, Mn, Cr, Fe, Co, Mo, Ni, Cu, Y, V, Zr, Nb, Rb and Cs, alloys thereof, oxides thereof, hydroxides thereof, silicides thereof, silicon oxides thereof, nitrides thereof, oxynitrides thereof, carbides thereof or carboxides thereof.

3. The method of claim 1, wherein in the silicon-based molded body,
   the silicon and the silicon dioxide are mixed at a molar ratio of 1:0.25 to 1:4.

4. The method of claim 1, wherein in Step (a),
   a metal compound is further introduced into the silicon molten metal.

5. The method of claim 1, wherein the silicon-based molded body has a porosity of 5% to 65%.

6. The method of claim 1, wherein the silicon-based molded body has a molding density of 0.7 and 3.8 g/cm³ and a true density of 2.1 to 4.0 g/cm³.

7. The method of claim 1, wherein the silicon-based molded body has a moisture content of 20% or less.

8. The method of claim 1, wherein in the silicon-based molded body, a value of [Equation 1] $\{A(D_{50})+B(D_{50})\}/\{C(D_{max})-C(D_{10})\}$ (provided that A is a raw material having a relatively large particle size before the silicon-based molded body is mixed, B is a raw material having a relatively small particle size before the silicon-based molded body is mixed, and C is a mixture comprising A and B) satisfies 5 or less.

9. The method of claim 1, wherein the silicon oxide is collected by any one method of deposition or capture.

* * * * *